June 18, 1968 E. M. CHERRY 3,389,272

GATED TRANSMISSION ARRANGEMENT

Filed March 17, 1964 2 Sheets-Sheet 1

INVENTOR
E. M. CHERRY
BY Lucian C. Canepa
ATTORNEY

June 18, 1968 E. M. CHERRY 3,389,272

GATED TRANSMISSION ARRANGEMENT

Filed March 17, 1964 2 Sheets-Sheet 2

3,389,272

GATED TRANSMISSION ARRANGEMENT

Edward M. Cherry, Summit, N.J., assignor to Bell Telephone Laboratories, Incorporated, New York, N.Y., a corporation of New York

Filed Mar. 17, 1964, Ser. No. 352,603

23 Claims. (Cl. 307—257)

ABSTRACT OF THE DISCLOSURE

A gated transmission arrangement which is designed to selectively transmit current, rather than voltage signals. Signal voltages are converted into current signals by a high output impedance current source. The gating apparatus, which typically comprises a diamond diode bridge network, selectively passes the current signal to a low input impedance load, thereby minimizing output voltage swings and the effect of stray capacity. Voltage suppression has been included to prevent transmission of spurious signals when the gating apparatus is in a nonconducting state.

Figure 1:
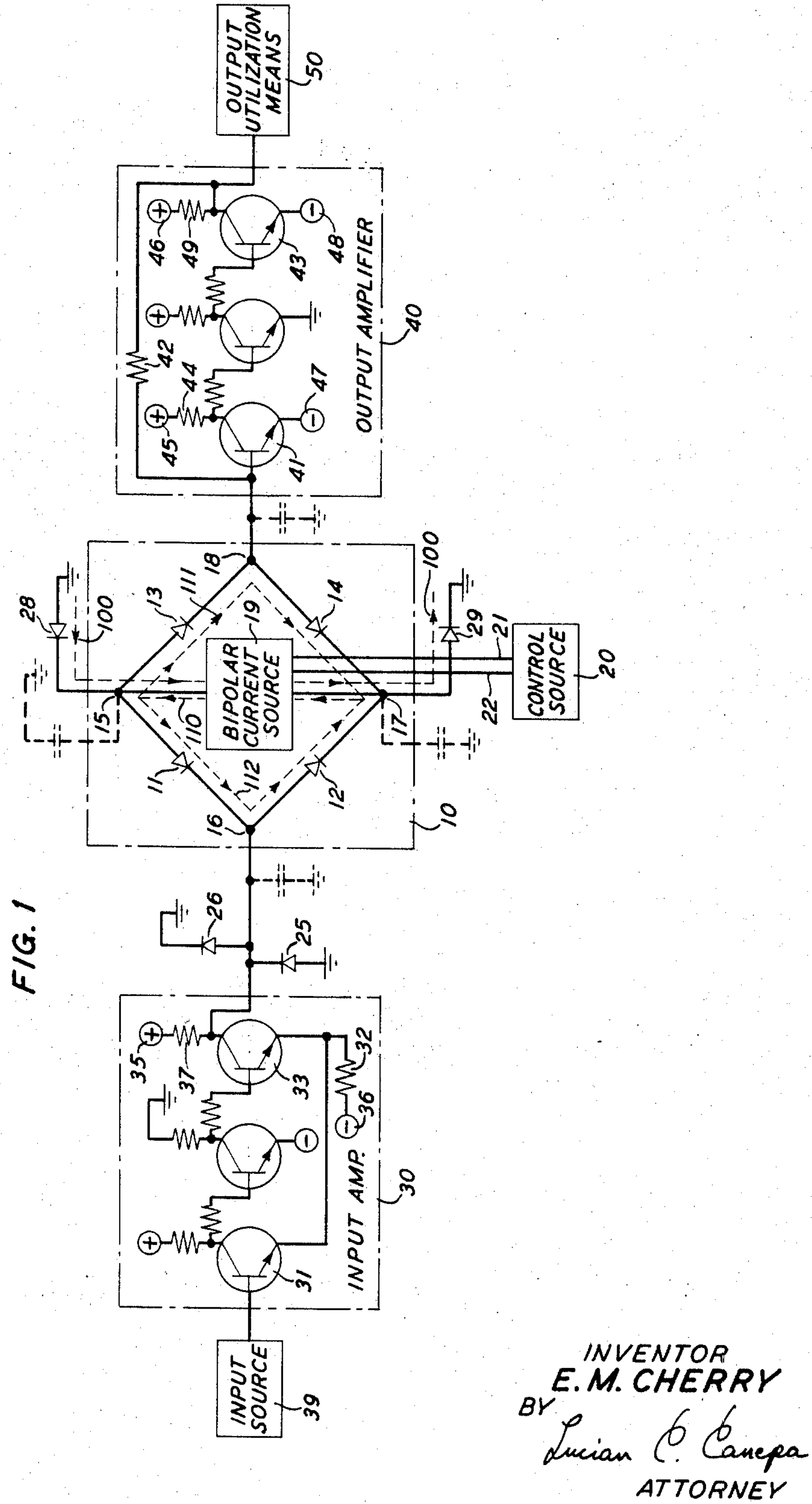

This invention relates to signal transmission arrangements and, more specifically, to a gated transmission channel which serially includes a diamond diode gate.

Diode gates have been widely employed in the signal processing art to selectively pass or block electronic transmission. For example, F. V. Windes et al. Patent 3,098,-214, issued July 16, 1963, describes a plurality of such gates in a signal concentrator to connect one of a plurality of input signal sources with a single output lead. A somewhat similar type of circuit operation is performed by a diode gate in a circuit arrangement illustrated in C. W. Sherwin Patent 2,803,703, issued Aug. 20, 1957.

In both of the above-described arrangements, as well as in other prior art embodiments, the diode gate circuits are operated in a voltage mode to transmit a potential therethrough. That is, the input terminal of the gate is driven by a low output impedance voltage source while the gate output terminal, in turn, supplies an output potential to a high impedance load.

However, such prior art gated transmission arrangements are inherently characterized by several distinct disadvantages. First, the stray capacity necessarily associated with a diode gate reacts with the high output load impedance to severely limit the operative frequency range of prior art gating embodiments. Also, should the input signal amplitude be less than a volt, or should very accurate transmission be required, prior art arrangements require a diode gate comprising carefully matched, and therefore expensive, diodes.

It is therefore an object of the present invention to provide an improved gated transmission circuit.

More specifically, an object of the present invention is the provision of a gated transmission channel which is operative over a wide frequency band.

Another object of the present invention is the provision of a gated transmission channel which accurately processes input signals of any desired magnitude.

These and other objects of the present invention are realized in a specific, illustrative transmission arrangement which serially includes a diamond diode gate. The gate includes four diodes joined in a bridge array, with a bipolar gating current source being connected to a first pair of opposite bridge terminals. The composite transmission arrangement further includes a high output impedance, series feedback input amplifier and a low input impedance, shunt feedback output amplifier which are respectively connected to the two remaining bridge terminals.

The input amplifier supplies a continuous, analog current signal to the diode gate. When the gating current source assumes a selected polarity, the input signal current is passed through the gate to the output amplifier.

Since the diode gate is employed to selectively pass current rather than voltage signals, matched diodes are not required for highly accurate signal transmission, even at low current levels. Further, the low input impedance of the output amplifier renders the transmission channel operative over a wide frequency band.

It is thus a feature of the present invention that a gated transmission arrangement be operated in a current mode, and serially include a diamond diode gate comprising randomly selected, unmatched rectifying diodes.

It is another feature of the present invention that a gated transmission channel include first and second parallel branches each including two rectifying diodes connected in series-adding thereby forming a junction point therebetween, a bipolar gating current source shunted across the first and second parallel branches, and a high output impedance, series feedback input amplifier connected to the junction point between the diodes included in one of the parallel gate branches.

It is still another feature of the present invention that a gated transmission channel include a current responsive gate comprising first and second parallel branches each including two rectifying diodes connected in series-adding thereby forming a junction point therebetween, a bipolar gating current source shunted across the first and second parallel branches, and a low input impedance, shunt feedback, output amplifier connected to the junction point between the diodes included in one of the parallel gate branches.

A complete understanding of the present invention and of the above and other features, advantages and variations thereof, may be gained from a consideration of the following detailed description of an illustrative embodiment thereof presented hereinbelow in conjunction with the accompanying drawing, in which:

FIG. 1 is a schematic diagram of an illustrative gated transmission channel which embodies the principles of the present invention; and FIGS. 2(A) through 2(G) are timing diagrams illustrating current and voltage waveforms associated with selected circuit elements included in FIG. 1.

Referring now to FIG. 1, there is shown a specific, illustrative, selectively gated transmission arrangement serially including a diamond diode gate generally included within the broken-line rectangle 10. The gate 10 comprises four conventional rectifying diodes 11 through 14 which are connected in a bridge array via four junction points 15 through 18. A bipolar current source 19 is connected between the bridge junction points 15 and 17, and supplies thereto a constant current which selectively flows in one of the two possible polarities. The source 19 is adapted to include a high internal impedance.

A control source 20 is connected to the bipolar current source 19 via two control leads 21 and 22. The source 19 supplies a continuous current flowing in an upwards or unblocking direction, indicated by the dashed vector 110, when the control lead 21 has last been energized. Correspondingly, the source 19 supplies a downwards, blocking current in the direction indicated by the dashed vector 100 when the control lead 22 has last been energized. In addition, two diodes 28 and 29 respectively connect the bridge junctions 15 and 17 to a common ground terminal. As will be more fully discussed hereinafter, the diodes 28 and 29 provide positive turnoff for the diode gate 10 when it is in a blocked condition, and these devices also serve to prevent any spurious signals from reaching the output gate junction 18 when the gate 10 is nonconductive.

An input signal source 39 is connected to the input terminal of an input amplifier 30 which is, in turn, connected to the input node 16 of the diode gate 10. The input amplifier 30 comprises a conventional three-stage, current-feedback amplifier including an input transistor 31 and an output transistor 33. Current feedback is provided by a resistor 32 which is connected to the emitter terminals of the transistors 31 and 33. A positive voltage source 35 and a negative voltage source 36 are included in the input amplifier 30. The magnitudes of the sources 35 and 36, along with the values of the feedback resistor 32 and a collector resistor 37 associated with the transistor 33, are adapted to provide a quiescent zero potential at the collector terminal of the transistor 33 when the input source 39 is supplying a zero potential.

Since the amplifier 30 includes three stages of forward gain, along with series current feedback, this circuit embodiment effectively acts as a current source with a high output impedance. That is, corresponding to a voltage signal $v(t)$ supplied by the input source 39, the collector of the transistor 33 will supply a current $i(t)$ to the input node 16 of the diode gate 10, wherein $$i(t)=\frac{v(t)}{R_{32}}\frac{A}{1+A} \quad (1)$$

with $R_{32}$ being the resistance of the element 32 and where A comprises the loop gain of the feedback amplifier 30. Since the loop gain A is large for three transistor stages, $i(t)$ is approximately given by $$i(t)=\frac{v(t)}{R_{32}} \quad (2)$$

It is observed from the above that the amplifier 30 essentially functions as a voltage-to-current converter.

Two rectifying diodes 25 and 26 are respectively connected in opposite polarities between the input gate node 16 and ground. As will be more fully described hereinafter, these diodes prevent large voltage signals from being generated when the gate 10 is switched from an open to a blocked condition, without significantly affecting transmission through the gate when it is in an open, or unblocked condition.

An output amplifier 40 is included in the FIG. 1 gated transmission embodiment to connect the gate output junction 18 with an output utilization means 50. The output amplifier 40 comprises a three-stage shunt feedback amplifier which is characterized by extremely low input and output impedances. The amplifier 40 includes an input transistor 41 and an output transistor 43 respectively having their collectors connected via load resistors 44 and 49 to positive potential sources 45 and 46, with the emitters of these devices being connected to negative voltage sources 47 and 48. Finally, a shunt feedback resistor 42 connects the collector of the output transistor 43 with the base of the input transistor 41. The magnitudes of the sources 45 through 48 are adjusted such that a zero potential quiescently exists at the base of transistor 41 when this base terminal is not being supplied with a current signal from the gate 10. By assuming a conservative gain of 50 for each of the three transistor stages, and a typical value of 10,000 ohms for the resistor 42, it is noted that the input impedance of the output amplifier 40 is less than one-tenth of an ohm.

Since the amplifier 40 is characterized by low input and output impedances, it essentially functions as a current-to-voltage converter. Specifically, when a current $i'(t)$ is supplied to the input terminal of the amplifier 40 by the output node 18 of the gate 10, a voltage $v_0(t)$ is supplied by the collector of the output transistor 43 to the output utilization means 50 where $$v_o(t)=i'(t)R_{42}\cdot\frac{A'}{1+A'} \quad (3)$$

wherein $R_{42}$ is the resistance of element 42 and A′ is the loop gain of the amplifier 40. Since the loop gain A′ is high over a wide frequency band, the output voltage $v_o(t)$ may be closely approximated by $$v_o(t)=i'(t)R_{42} \quad (4)$$

As will become clear from the following discussion, $i'(t)$ used in Equations 3 and 4 and $i(t)$ included in Equations 1 and 2 will, in fact, turn out to be identical.

Figure 2:
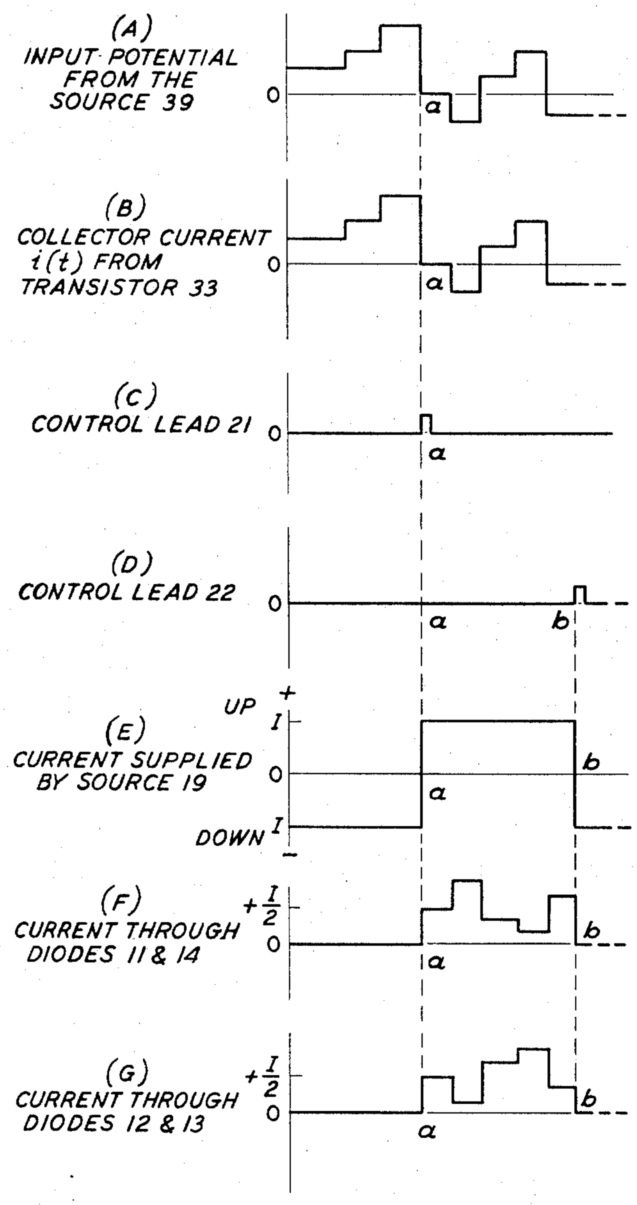

With the above-described organization in mind, an illustrative sequence of circuit operation for the FIG. 1 gated transmission arrangement will now be described. Assume that the input source 39 is supplying the quantized analog-type input potential shown in FIG. 2(A), and that the control source 20 has last energized the control lead 22 thereby blocking transmission through the gate 10. Under these conditions, the bipolar current source 19 is supplying a downwards current of magnitude I, as indicated by the vector 100 in FIG. 1, and as illustrated in FIG. 2(E) prior to the time *a* shown therein. This current also flows through the diodes 28 and 29.

The current flow through the diodes 28 and 29 respectively establishes a small positive potential at the gate node 17 and a small negative potential at the gate node 15. These voltages serve to back bias each of the gating diodes 11 through 14, thereby blocking transmission through the gate 10. Hence, the output signal current $i(t)$ supplied by the input amplifier 30, shown in FIG. 2(B), is blocked at the input node 16 of the gate 10. Under this circuit condition, the current $i(t)$ appearing at the collector of the transistor 33 divides between the resistor 37 and the diodes 25 and 26. This condition prevails for the interval preceding the time *a* shown in FIGS. 2(A) through 2(G).

At the time *a* shown in FIG. 2(C), let the control source 20 now energize the control lead 21. Responsive thereto, the bipolar current source 19 supplies an upward flowing current I in the direction of the vector 110, which current divides approximately equally at the gate nodes 15 and 17. That is, one-half of the current I flows through the diodes 11 and 12 as indicated by the vector 112 in FIG. 1, with the other half flowing through the diodes 13 and 14 as indicated by the vector 111. Hence, under these conditions, each of the diodes 11 through 14 is forward biased, thereby rendering the gate conductive.

The signal current $i(t)$ supplied by the input amplifier 30 to the input gate node 16 now divides between the diodes 11 and 12. Since the bipolar current source 19 presents a high impedance to current flowing at the nodes 15 and 17, each portion of the signal current also flows through the diodes 13 and 14 with the composite signal current $i(t)$ being reconstructed at the output node 18. As illustrated in FIGS. 2(F) and 2(G), the currents which flow through the respective gate diodes 11 through 14 are algebraic sums of approximately one-half the current supplied by the source 19, i.e., $I/2$, and approximately one-half the signal current.

Responsive to the reconstructed signal current wave appearing at the gate output node 18, the output amplifier 40 supplies a corresponding output voltage $v_0(t)$ to the output utilization means 50. The output voltage $v_0(t)$ is computed by combining Equations 2 and 4 to replace $i'(t)$ with $i(t)$, such that $$v_o(t)=i(t)R_{42}=\left(\frac{v(t)}{R_{32}}\right)R_{42} \quad (5)$$

Thus, the over-all gain G from the voltage $v(t)$ supplied by the source 39 to the voltage $v_o(t)$ received by the output utilization means 50 is given by $$G=\frac{v_o(t)}{v(t)}=\frac{R_{42}}{R_{32}} \quad (6)$$

Hence, it is observed that the composite gain is simply the quotient of two resistors, which is extremely stable and independent of variations which normally characterize active elements.

Several significant, illustrative advantages obtaining when the diamond diode gate 10 is conducting in a current mode, i.e., driven at its input node 16 by a high impedance current source and terminated at its output node 18 by a low input impedance current-to-voltage converter, will now be considered. First, for the reasons set forth below, it is noted that the gate 10, and thereby also the composite FIG. 1 transmission channel, is operative over an extremely wide frequency band. This is not the case where a diode gate is operated in the voltage mode.

As discussed hereinabove, the input impedance of the output amplifier 40 is typically very low, comprising less than one-tenth of an ohm. Thus, for even a relatively high value of signal current $i(t)$, the corresponding voltage variations at the base of the transistor 41, and thereby also the voltage swings at each of the gate nodes 15 through 18 is extremely small. For example, for maximum values of $i(t)$ approaching 10 milliamperes, the maximum gate voltage fluctuations are less than .001 volt. Hence, even assuming a relatively high stray capacity connecting each of the nodes 15 through 18 to ground, as shown by the dotted capacitors in FIG. 1, these parasitic elements do not limit the transmission frequency band.

This result follows since the upper frequency limitation of a transmission channel is a direct function of the energy necessary to charge the stray capacity thereof, which energy is directly proportional to the square of the signal voltage. However, since the FIG. 1 arrangement operates the diode gate 10 in a current mode, with extremely small voltage swings well under a volt, exceedingly little energy is required to charge the stray capacity associated with the circuit. Hence, it is observed that the operative frequency band for the FIG. 1 arrangement is extremely broad compared to prior art embodiments operating in a voltgae mode. Further, it is noted that prior art gated transmission arrangements may not employ low impedance output loads, since the gates included therein are operated in a voltage mode. The voltage output in such circuit combinations would be short-circuited by low load impedances.

Other distinct advantages accrue to the instant transmission arrangement. For example, the gate 10 accurately transmits the signal current from its input node 16 to its output node 18 independent of variations in the voltage-current characteristics of the particular diodes 11 through 14 employed, and also independent of the amplitude of the signal current. This is necessarily the case since the input signal current supplied to the input node 16 is totally recombined at the output node 18 independent of the unbalanced manner in which it divides at the input node 16. However, in prior art diode gate embodiments operating in a voltage mode, the output potential necessarily differed from the input potential by any differences between the characteristics of the diodes on the output half of the gate, as compared with the diodes on the input gate portion. Further, it should be observed that where the input signal is of the order of tenths of a volt, any unbalance in the gate diodes could introduce an error of 50% or more in signal transmission.

The above discussion is directed to the operation and features of the FIG. 1 gated transmission channel when the gate 10 included therein resides in a conducting state. Assume now that at the time *b* shown in FIG. 2(D), the control source 20 energizes the control lead 22 thereby blocking transmission through the diode gate 10. Responsive thereto, the bipolar source 19 again supplies a downwards current, in the direction of the vector 100, which flows through the diodes 28 and 29. This back biases the gate diodes 11 through 14 thereby inhibiting transmission through the gate 10, and constraining the current $i(t)$ supplied by the input amplifier 30 to find a complete circuit path elsewhere.

Absent the diodes 25 and 26, this signal current would flow through the collector resistance 37 associated with the transistor 33 of the amplifier 30, thereby creating relatively large voltage variations at the input of the gate 16. Such a voltage swing might then be transmitted by the shunt capacity associated with the gating diodes 11 through 14 to the output node 18, hence resulting in an undesired, spurious output signal. However, with the inclusion of the diodes 25 and 26, the potential appearing at the collector of the transistor 33 and the input node of the gate 10 is clamped between the forward conductive potentials of the diodes 25 and 26. Hence, this swing is limited to ±.2 or ±7 of a volt, depending respectively on whether germanium or silicon diodes are employed. Such minute voltage swings cannot be transmitted by the abovementioned parasite capacities to any significant degree. Note, however, that the diodes 25 and 26 do not affect transmission through the gate 10 when it is in an unblocked condition, since the extremely low input impedance of the output amplifier 40 limits the voltage variations at the input gate node 16 to extremely low values much less than .2 of a volt.

To further prevent spurious signals from being transmitted to the output amplifier 40 when the gate 10 is in a blocked condition, note that the diodes 28 and 29, which conduct when the gate 10 is nonconductive, present low impedances to ground to any signals appearing at the nodes 15 and 17. Hence, it is observed that any signals appearing at this time at the collector of the transistor 33 are doubly attenuated, first by the diodes 25 and 26 and then again by the diodes 28 and 29. Hence, the gate 10 has been shown to accurately transmit current signals therethrough while in an unblocked condition, while effectively isolating the input source 39 and the output means 50 while the gate 10 is blocked.

Summarizing the basic concepts of an illustrative embodiment of the present invention, a selectively gated transmission channel serially includes a diamond diode gate. The gate includes four diodes joined in a bridge array, with a bipolar gating current source being connected to a first pair of opposite bridge terminals. The composite transmission arrangement further includes a high output impedance, series feedback input amplifier and a low input impedance, shunt feedback output amplifier which are respectively connected to the two remaining bridge terminals.

The input amplifier supplies a continuous, analog current signal to the diode gate. When the gating current source assumes a selected polarity, the input current is passed through the gate to the output amplifier.

Since the diode gate is employed to selectively pass current rather than voltage signals, matched diodes are not required for highly accurate signal transmission, even at low current levels. Further, the low input impedance of the output amplifier renders the transmission channel operative over a wide frequency band.

It is to be understood that the above-described arrangements are only illustrative of the application of the present invention. Numerous other arrangements may be devised by those skilled in the art without departing from the spirit and scope of the present invention. For example, while both the input and output amplifiers 30 and 40 were shown to be of particular configurations comprising three amplifying stages, other current or voltage amplifiers well known in the art might well have been employed.

Also note that while the diodes 25, 26, 28 and 29 are each shown as having one terminal thereof connected to ground, the general requirement therefor is that they be connected to a voltage equal to the quiescent potential appearing at the input node 16 of the diode gate 10.

What is claimed is:

1. In combination in a gated transmission channel; a current responsive gate comprising first and second parallel branches each including two rectifying diodes connected in series-aiding thereby forming a junction point therebetween, and a bipolar current source shunted across said first and second parallel branches; a high output impedance, input current source connected to the junction point between said diodes included in said first parallel gate branch; and a low input impedance, output amplifier connected to the junction point between said diodes included in said second parallel gate branch.

2. A combination as in claim 1, further including first and second signal suppressing diodes each having a different terminal thereof connected to said junction point between said diodes included in said first parallel gate branch, and first zero impedance means connecting the remaining terminals of said first and second diodes together.

3. A combination as in claim 2, further including third and fourth signal suppressing diodes each having a different terminal thereof respectively connected to a different junction of said first and second parallel branches, and second zero impedance means connecting the remaining terminals of said third and fourth diodes together.

4. A combination as in claim 3, further including an output utilization means connected to said output amplifier, and wherein said input current source comprises a voltage-to-current converter and an input voltage source connected thereto.

5. A combination as in claim 4, further comprising a control source connected to said bipolar current source.

6. In combination, in a gated transmission channel; a diode bridge circuit including four rectifying diodes, respectively connected via an input junction, an output junction, and two intermediate junctions; an input current signal source, having high output impedance, connected to said input junction; a low input impedance load connected to said output junction; and enabling current source means connected between said two intermediate bridge junctions.

7. A combination as in claim 6 wherein said input current source includes a series feedback amplifier, and wherein said output load includes a shunt feedback amplifier.

8. A combination as in claim 6, further comprising voltage suppression means connected to said input bridge junction and to said two intermediate junctions.

9. A combination as in claim 8, further comprising output utilization means connected to said low input impedance load, and control source means connected to said enabling current source means.

10. In combination, a diamond diode gate including an input junction, an output junction, and two intermediate junctions; high output impedance, current source means connected to said input junction; and low input impedance, output means connected to said output junction.

11. A combination as in claim 10, further comprising voltage suppression means connected to said input junction and to said two intermediate junctions.

12. A combination as in claim 11, wherein said voltage suppression means comprises first and second oppositely-poled rectifying diodes connected to said input junction and third and fourth oppositely-poled serially-connected diodes connected to said two intermediate junctions.

13. In combination in a selectively gated transmission channel, an input voltage source, a high output impedance voltage-to-current converter connected to said input voltage source, a low input impedance current-to-voltage converter, and selectively-operated current gating means connecting said voltage-to-current converter with said current-to-voltage converter.

14. A combination in claim 13, further comprising voltage suppression means connected to said selectively-operated current gating means.

15. A combination as in claim 14, wherein said voltage suppression means comprises two shunt-connected oppositely-poled rectifying diodes.

16. A combination as in claim 15, wherein said current gating means comprises a diamond diode gate comprising first and second parallel branches each including two rectifying diodes connected in series-aiding, and a current source shunted across said first and second parallel branches.

17. In combination in a gated transmission channel; a current responsive gate comprising first and second branches each including two rectifying diodes connected in series-aiding thereby forming a junction point therebetween, and a current source shunted across said first and second parallel branches; and a high output impedance, input current source connected to the junction point between said diodes included in said first parallel gate branch.

18. A combination as in claim 17, further comprising a low input impedance, output amplifier connected to the junction point between said diodes included in said second parallel gate branch.

19. In combination in a gated transmission channel; a current responsive gate comprising first and second parallel branches each including two rectifying diodes connected in series-aiding thereby forming a junction point therebetween, and a current source shunted across said first and second parallel branches; and output means characterized by an input impedance of less than approximately one ohm connected to the junction point between said diodes included in said second parallel gate branch.

20. A combination as in claim 19, further comprising a high output impedance, input current source connected to the junction point between said diodes included in said first parallel gate branch.

21. A combination as in claim 19, further including first voltage suppression means connected to the junction point between said diodes included in said first parallel gate branch.

22. A combination as in claim 21, further comprising a common ground terminal, and second voltage suppression means connected between said common ground terminal and each junction of said first and second parallel branches.

23. A combination as in claim 22 wherein said first and second voltage suppression means are characterized by a maximum voltage threshold of approximately .7 volt.

References Cited

UNITED STATES PATENTS

| | | | |
|---|---|---|---|
| 2,788,486 | 4/1957 | Guggi | 324—51 X |
| 2,990,477 | 6/1961 | MacIntyre | 307—88.5 |
| 3,179,817 | 4/1965 | Bounsall | 307—88.5 |
| 3,231,686 | 1/1966 | Hueber | 179—107 X |
| 2,803,703 | 8/1957 | Sherwin. | |
| 3,098,214 | 7/1963 | Windes et al. | |

ARTHUR GAUSS, *Primary Examiner.*

J. D. FREW, *Assistant Examiner.*